May 8, 1956     D. J. REED ET AL     2,744,387
LIQUID FUEL VAPORIZER
Filed Aug. 4, 1952
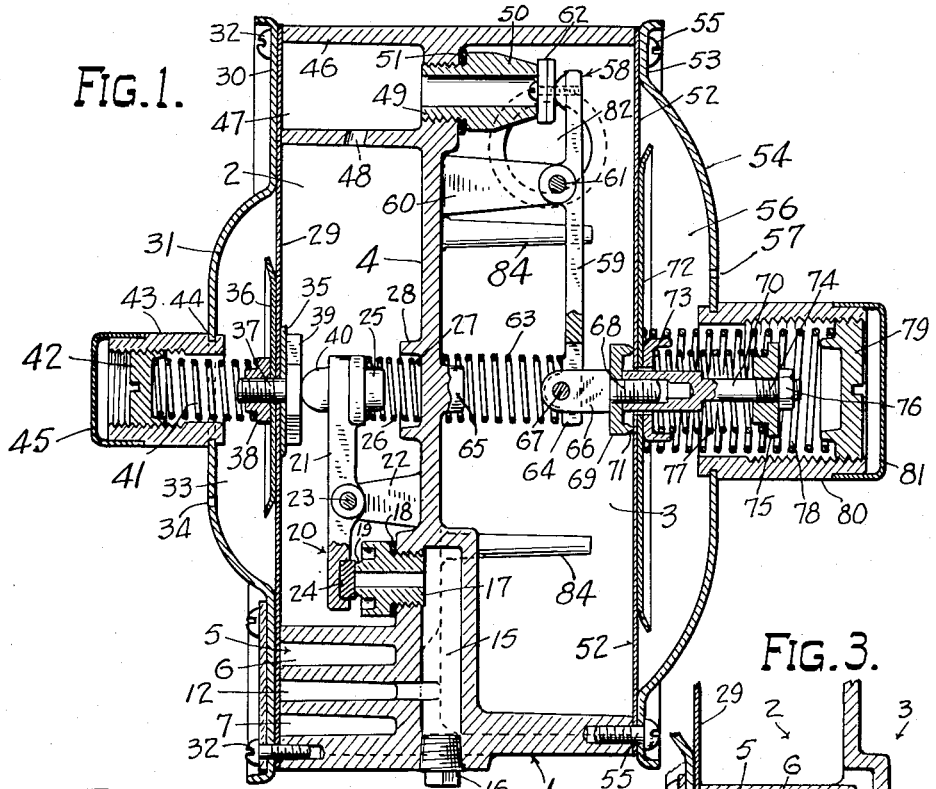
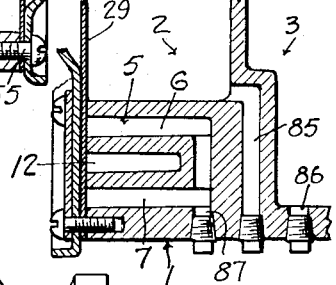
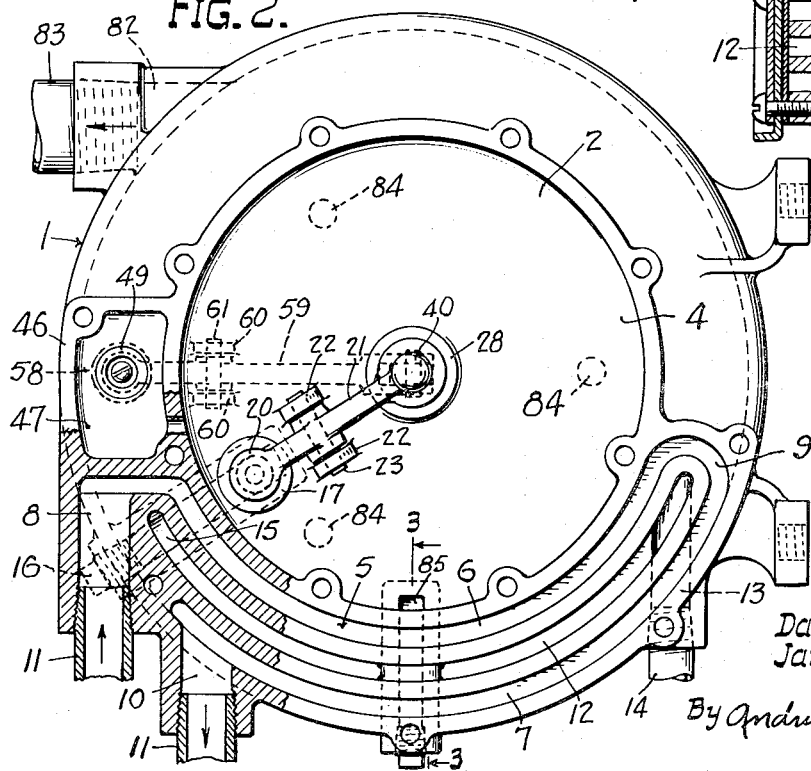
INVENTORS:
Daniel J. Reed
James H. Tanner
By Andrus & Scales
ATTORNEYS.

United States Patent Office 2,744,387
Patented May 8, 1956

2,744,387
LIQUID FUEL VAPORIZER

Daniel J. Reed and James H. Tanner, Milwaukee, Wis., assignors, by mesne assignments, to John M. Stover, Oklahoma City, Okla.

Application August 4, 1952, Serial No. 302,586

5 Claims. (Cl. 62—1)

This invention relates to a method and apparatus for vaporizing fuel for an internal combustion engine and more particularly to the vaporization of low pressure gases such as propane and butane.

To utilize liquid propane or butane or a mixture thereof for the operation of internal combustion engines it is necessary to provide apparatus for vaporizing the liquid fuel and regulating the pressure of the vaporized fuel before the same is drawn into the intake manifold by engine suction.

As the demand for fuel by the engine is increased, the rate of vaporization of the liquid fuel is correspondingly increased with a resulting high demand for heat in the vaporizing apparatus. This high demand for heat frequently results in a "freezing" of the parts of the apparatus.

To prevent "freezing" of the vaporizing apparatus during high rates of vaporization many attampts have heretofore been made to supply heat to the fuel and to vaporize in stages so that the rate of vaporization in the first stage is not appreciably increased on sudden demands for fuel. However these methods have not been entirely successful, for, although "freezing" may have been minimized, the temperature of the gaseous fuel drawn into the manifold was raised to such an extent as to substantially lower the thermal efficiency of the engine.

The present invention provides an apparatus for volatilizing liquid butane or the like in two pressure stages. Liquid fuel is introduced into a primary chamber by a primary regulating machanism at a pressure of about five pounds per square inch above atmospheric. The vaporizing fuel is then drawn into a secondary chamber through a secondary regulating mechanism and the pressure of the gaseous fuel is reduced to about five ounces per square inch above atmospheric. This gaseous fuel in the secondary chamber is available for use in the engine and is released in accordance with engine suction or vacuum.

To supply heat to the vaporizing apparatus of the present invention, a generally U-shaped heating passage is provided beneath the primary chamber and serves to conduct a heating medium which may consist of a portion of the engine coolant. The liquid fuel is introduced from the fuel tank into a fuel passage which extends between the legs of the U-shaped heating passage. As the liquid fuel passes through the fuel passage to the primary chamber it is heated sufficiently by the heating medium so that when volatilized on entry into the primary chamber, no "freezing" will occur. Heat is applied to both the liquid fuel and to the vaporized fuel in the primary chamber, but no heat is applied directly to the fuel vapors in the secondary chamber so that the temperature of the vapors being drawn into the engine from the secondary chamber will be sufficiently low to obtain a high thermal efficiency in the engine.

One object of the present invention is to provide an apparatus for effectively vaporizing liquid fuels and regulating the pressure of the fuel vapors.

Another object is to provide an apparatus for vaporizing liquid fuel whereby the pressure of the fuel is reduced in two separate stages and heat demanded by the vaporization is supplied only to the first of the two stages.

Another object of the invention is to provide an efficient method of initially supplying heat to liquid fuel before said fuel is volatilized to prevent freezing of the volatilizing apparatus.

Another object is to provide a vaporizing apparatus whereby the temperature of the vaporous fuel being drawn to the engine is maintained at a minimum to insure high thermal efficiency in the engine.

Still another object is to provide an apparatus for vaporizing liquid fuel whereby heat is supplied to the vaporizing chamber to vaporize any liquid fuel which may have passed into the vaporizing chamber without having been completely vaporized.

Other objects and advantages will appear hereinafter in connection with the description of an embodiment of the invention illustrated in the accompanying drawing.

In the drawing:

Figure 1 is a vertical sectional view of the vaporizer of the invention;

Fig. 2 is an end elevational view looking from the left in Figure 1 with parts broken away and sectioned; and Fig. 3 is a detail section of the drain construction of the vaporizer.

Referring to the drawing there is shown a vaporizing and pressure regulating apparatus for an internal combustion engine comprising a generally hollow body portion or casing 1 which is configured to define an annular primary or vaporizing chamber 2 on one side and an annular secondary or pressure regulating chamber 3 on the other side. Chambers 2 and 3 are in a back-to-back relation and are separated by the central wall 4 of casing 1.

The lower portion of casing 1 beneath primary chamber 2 is provided with a U-shaped chamber 5 which includes an upper leg 6 and a lower leg 7. Both of the legs 6 and 7 have a generally arcuate configuration to complement the bottom portion of chamber 2. Chamber 5 constitutes a circulating passageway for a heating medium whereby heat may be supplied to the liquid fuel entering primary chamber 2 and to the primary chamber itself. Casing 1 is preferably constructed of a light weight metal having good heat conductivity properties so that heat may be readily transferred from the heating medium to the fuel.

An inlet passage 8 provides communication between the exterior of casing 1 and the upper leg 6 of chamber 5. Upper leg 6 extends beneath chamber 2 from inlet passage 8 to the opposite side of casing 1 and hence downwardly at 9 to connect with lower leg 7 of chamber 5. Leg 7 doubles back beneath leg 6 and joins an outlet passage 10, adjacent inlet passage 8, which provides communication between the exterior of casing 1 and leg 7. Passages 8 and 10 are provided with threads for engagement with suitable pipe fittings 11 which establish communication with a suitable source of heated medium. The heating medium may constitute a portion of the engine coolant or any other heated fluid such as oil or water.

Heating chamber 5 has a generally flat shape in cross section as shown in Figure 1 and has a width substantially equal to that of the primary chamber 2.

During periods of high engine speed or sudden engine demand, liquid fuel may occasionally pass into chamber 2 without being vaporized and tend to collect at the bottom thereof in the form of a liquid pool. However, as the heating chamber 5 is directly beneath chamber 2, this pool is readily vaporized by the circulating heating medium so that ordinarily there is no liquid fuel present in the chamber 2.

A liquid fuel chamber 12 is provided in casing 1 intermediate the legs 6 and 7 of heating chamber 5. Liquid fuel passing through chamber 12 to the vaporizing chamber 2 absorbs heat by conduction from the heating medium circulating through chamber 5 and is heated to a sufficiently high temperature so that the liquid fuel on expanding and vaporizing in chamber 2 will not "freeze" the apparatus. Chamber 12 has a generally arcuate shape to complement both the bottom portion of primary chamber 2 and legs 6 and 7. An inlet passage 13 provides communication between one end of fuel chamber 12 and the exterior of casing 1 and a suitable fitting 14 engages the threaded portion of passage 13 and establishes communication between passage 13 and a tank or other supply of liquid fuel.

The other end of chamber 12, adjacent the heating inlet passage 8 communicates with a radial passage 15 which extends inwardly from the exterior of casing 1. The outer extremity of passage 15 is provided with a suitable plug 16 which closes off passage 15 to the atmosphere.

A fitting 17 having a passageway therethrough is threadedly engaged in a suitable opening in the central wall 4 of casing 1 and establishes communication between the primary vaporizing chamber 2 and the inner extremity of radial fuel passage 15. A suitable gasket 18 is interposed between a shoulder of fitting 17 and wall 4 to seal the joint. The outer end of fitting 17 is provided with a beveled edge to define a valve seat 19.

A valve member 20 is employed to regulate the flow of liquid fuel through fitting 17 into the vaporizing chamber 2. Valve member 20 comprises a valve lever 21 which is pivotally secured between brackets 22, which extend outwardly from wall 4, by pin 23. The outer portion of lever 21 carries a washer 24 to engage and seal the beveled end or valve seat 19 of fitting 17.

The inner portion of valve lever 21 is formed with a generally cylindrical projection 25 which receives one end of a spring 26. The other end of spring 26 abuts the bottom of recess 27 defined by an annular ferrule 28 which extends outwardly from wall 4 of casing 1. Spring 26 acts to maintain valve 24 in the closed position.

The open side of the primary or vaporizing chamber 2 of casing 1 is closed by a diaphragm 29. The diaphragm 29 may consist of any durable and flexible sheet-like material. The diaphragm 29 is clamped intermediate the peripheral edge of casing 1 and the peripheral flange 30 of a disc-shaped cover 31 by a plurality of circumferentially spaced screws 32. An outer chamber 33 is defined by diaphragm 29 and cover 31. Cover 31 is provided with a port 34 which establishes communication between outer chamber 33 and the atmosphere.

A washer 35 is disposed in contacting relation with the inner face of diaphragm 29 and a backing plate 36 is similarly disposed against the outer face thereof. A bolt 37 extends outwardly through aligned openings in washer 35, diaphragm 29 and plate 36 and is threadedly engaged by nut 38. The head 39 of bolt 37, being on the inner side of diaphragm 29, is adapted to contact a knob-like projection 40 formed in the inner portion of valve lever 21.

One end of a spring 41 is received by nut 38 and the other end of spring 41 bears against an adjustable screwmember 42 which is threadedly received within head 43. Head 43 projects outwardly through a suitable opening in cover 31 and is provided with a circumferential groove 44 which receives the annular edge of cover 31 bordering said opening to secure head 43 to the cover. The outer end of head 43 is closed by a cap 45.

Spring 41 urges valve 20 to the open position and thereby opposes the action of spring 26. As an equilibrium vapor pressure of about five pounds per square inch is desired in primary chamber 2, this vapor pressure plus the force of spring 26 should exceed the force of spring 41 and the atmospheric pressure on the outer face of diaphragm 29 to move valve 20 to the closed position. If the pressure in chamber 2 falls below five pounds per square inch the force of spring 41 and the atmospheric pressure will overbalance the vapor pressure within chamber 2 and the force of spring 26 and tend to flex diaphragm 29 inwardly forcing nut 38 against projection 40 and thereby opening valve 20 and admitting additional fuel into chamber 2 to maintain the vapor pressure therein at five pounds per square inch. By adjusting screw 42 the force of spring 41 can be varied to permit any equilibrium vapor pressure, within limits, in primary chamber 2.

Casing 1 is provided with an external boss 46 which defines a chamber 47. An opening 48 provides communication between chamber 47 and primary chamber 2.

An opening 49 is provided in central wall 4 of casing 1 and an orifice fitting 50 is threaded into passage 49 and extends inwardly into chamber 3. A gasket 51 is interposed between a shoulder on the fitting 50 and the wall 4 to seal the joint. Fuel vapors from chamber 2 pass to the secondary chamber 3 by way of opening 48, chamber 47 and orifice fitting 50.

The open side of the secondary chamber 3 of casing 1 is closed by a flexible diaphragm 52. Diaphragm 52 is clamped between the peripheral edge of casing 1 and the peripheral flange 53 of a cover 54 by a plurality of circumferentially spaced screws 55. An outer chamber 56 is defined by the diaphragm 52 and the cover 54. A vent 57 is provided in the cover 54 to establish communication between chamber 56 and the atmosphere.

A secondary valve member 58 is employed to regulate the flow of fuel vapor through orifice fitting 50 into chamber 3. Valve member 58 comprises a valve lever 59 which is pivotally secured between brackets 60, which extend outwardly from wall 4, by pin 61.

The outer portion of valve lever 59 carries a valve 62 in position to engage and seal the open end of orifice fitting 50 and thereby control the entry of vapor into chamber 3.

One end of a spring 63 bears against the forked inner portion 64 of lever 59 and the other end of spring 63 is received by an annular boss 65 formed on the central wall 4 of casing 1. Spring 63 urges valve 62 to the closed position. One end of a spacer bracket 66 is pivotally secured between the prongs 64 of the forked inner portion of lever 59 by pin 67. The other or outer end of spacer bracket 66 has a reduced configuration and is provided with an external thread. The reduced outer end 68 of bracket 66 extends through an axial opening formed in a safety valve cup 69 and is threadedly engaged by one end of rod 70. Valve cup 69 is provided with a peripheral flange 71 which contacts diaphragm 52 and defines a valve seat.

The inner end of rod 70 is generally square in cross section at the inner end and, when threaded down, on the stem 68 of bracket 66, bears against the face of valve cup 69 and clamps the cup 69 against spacer bracket 66.

A backing plate 72 is disposed in contacting relation with the outer face of diaphragm 52 and a cup member 73 is disposed against the outer face of plate 72. Diaphragm 52, plate 72 and cup 73 are provided with aligned openings which loosely receive rod 70. It is desirable to provide a clearance between rod 70 and the edges of the aligned openings, and this may be accomplished by constructing the openings with a round configuration while this end of rod 70, as stated, is of a square shape.

Rod 70 is provided with an externally threaded cylindrical outer end portion 74 which receives a washer 75 and is threadedly engaged by nut 76. A spring 77 encircles rod 70 and is confined between washer 75 and cup member 73. Spring 77 urges the flange 71 of valve cup 69 into sealing engagement with the inner face of diaphragm 52.

A second spring 78 is disposed concentrically about spring 77 and the inner end of spring 78 bears against backing plate 72. The outer end of spring 78 abuts an adjustable screw member 79 which is threadedly received within cover head 80. A suitable cap 81 is employed to close off the outer end of head 80.

Casing 1 is provided with an outlet opening 82, as seen in Fig. 2, which receives a suitable fitting 83 for establishing communication between the secondary chamber 3 and the carburetor, not shown.

Casing 1 is also provided with a plurality of stops 84 which extend outwardly from central wall 4 into chamber 3 and serve to prevent excessive collapsing of diaphragm 52 in the event that the pressure in chamber 3 drops too low. Stops 84, however, do not interfere with the operation of diaphragm 52 under normal pressure conditions.

The bottom portion of casing 1 may be provided with suitable drainholes 85, 86 and 87 which communicate respectively with chambers 2, 3 and 5 whereby condensed vapor and heating medium may be drained from the apparatus during periods of extended engine shut-down. Under normal operating conditions drainholes 85, 86 and 87 are closed off by suitable plugs.

In operation, spring 78 urges valve 62 to the open position and thus opposes the action of spring 63. The pressure of the vapor is reduced from about five pounds per square inch in vaporizing chamber 2 to about five ounces per square inch in secondary chamber 3. The force of spring 63 and a pressure of five ounces per square inch in chamber 3 should balance the force of spring 78 and the atmospheric pressure in chamber 56. Thus if the pressure in chamber 3 exceeds five ounces per square inch valve 62 will close and, conversely, if the pressure falls below five ounces per square inch valve 62 will open to admit additional fuel vapor to chamber 3. It is preferred that the equilibrium vapor pressure in chamber 3 be slightly above atmospheric, for example about five ounces per square inch thereabove, but this equilibrium pressure may be varied by adjusting the tension of spring 78 through screw 79.

As the pressure in chamber 3 becomes greater than five ounces per square inch the diaphragm 52 is forced outwardly against the action of spring 78 and valve 62 moves to the closed position. Additional pressure within chamber 3 forces diaphragm 52 further outward and, as valve 62 is closed and lever 59 cannot be pivoted further, diaphragm 52 moves outwardly away from safety valve cup 69. This movement breaks the seal between valve cup flange 71 and diaphragm 52 and permits the gas vapor to vent into chamber 56 and hence to the atmosphere through the aligned openings in diaphragm 52, backing plate 72 and cup member 73.

The present invention provides a primary body of vaporized fuel having a pressure of about five pounds per square inch in chamber 2 and a secondary body of vaporized fuel in chamber 3 at a pressure of about five ounces per square inch. A sudden demand for fuel by the engine will momentarily reduce the pressure in secondary chamber 3 but will not produce a sudden increase in vaporization in primary chamber 2 with a resulting "freezing" of the apparatus. But rather with a sudden engine demand, secondary chamber 3 will draw vaporous fuel from primary chamber 2 and the rate of vaporization will not increase in chamber 2 until the pressure therein has materially decreased. It is apparent that the invention will produce a more uniform or constant rate of vaporization in primary chamber 2 and thereby reduce the tendency for the apparatus to "freeze."

A considerable amount of heat is demanded by the vaporization of the liquid fuel. This required heat cannot ordinarily be absorbed from the surroundings and thus heat must be supplied to the apparatus to prevent "freezing" thereof. At high rates of vaporization and if the apparatus is subjected to a low atmospheric temperature, as in the winter, this danger is multiplied considerably. The vaporizing apparatus of the invention supplies heat to the liquid fuel before entry thereof into the vaporizing chamber and also supplies heat to the vaporizing chamber itself to vaporize any liquid fuel contained therein and to prevent condensation of the vapor. The vapor in the primary chamber 2 is thereby maintained at sufficiently elevated temperature so that on expansion thereof into the secondary chamber 3 no heat need be supplied to the expanding gas and it will be cooled by expansion to a temperature slightly above its boiling point.

As no heat is supplied to the vapor in secondary chamber 3 except indirectly by conduction through casing 1, the vapors introduced to the engine from chamber 3 are at a low temperature which results in a higher thermal efficiency in the engine.

Various embodiments of the invention may be employed within the scope of the following claims.

We claim:

1. An apparatus for vaporizing liquid fuel, which comprises a hollow casing of heat conductive material and providing an internal vaporizing chamber wherein liquid fuel is vaporized, an inlet passage extending for a substantial distance beneath said vaporizing chamber within said casing and serving to conduct liquid fuel from a source of supply to the vaporizing chamber, a heating chamber partially surrounding the inlet passage and being disposed directly beneath the vaporizing chamber for circulation of heating fluid through the apparatus to heat the fuel in the vaporizing chamber and extending substantially coextensively with said inlet passage and complementing the shape of said inlet passage, said heating chamber serving to initially heat the fuel as the fuel flows through the inlet passage to the vaporizing chamber, and discharge means to carry off vaporized fuel from said vaporizing chamber.

2. In a vaporizing apparatus for vaporizing liquid fuel, a hollow casing, a vaporizing chamber in said casing wherein said fuel is vaporized with the bottom portion of the chamber being adapted to collect unvaporized fuel, a separate heating chamber provided in said casing beneath the vaporizing chamber and in conductive relation therewith with said heating chamber comprising a generally arcuate passage complementing the bottom portion of said vaporizing chamber and adapted to conduct a heating medium for vaporizing the unvaporized fuel in said vaporizing chamber, a fuel inlet passage in said casing and communicating with said vaporizing chamber, said inlet passage having a generally arcuate configuration to complement the heating chamber with the liquid fuel within said inlet passage being heated by said heating medium before entry of said fuel into said vaporizing chamber, and a vapor outlet port in said casing and communicating with said vaporizing chamber.

3. A vaporizing and pressure regulating apparatus for use with an internal combustion engine, which comprises a hollow casing having an internal wall defining on one side thereof a vaporizing chamber and on the other side thereof a vapor pressure regulating chamber, an inlet passage extending for a substantial distance beneath the vaporizing chamber for conducting liquid fuel to said vaporizing chamber, pressure responsive means in said vaporizing chamber to control the entry of fuel from said conducting means into the vaporizing chamber and to maintain a substantially uniform pressure in said vaporizing chamber, means in the internal wall of the casing for conducting vaporized fuel from said vaporizing chamber to said regulating chamber, pressure responsive means in the regulating chamber to control the entry of vaporized fuel into said regulating chamber and to maintain a uniform pressure above atmospheric therein, a heating chamber in said casing beneath the vaporizing chamber and comprising a circuitous passage extending above and below the inlet passage and around one end thereof for the circulation of a heating medium, the upper leg of the chamber being in heat conductive relation with the vaporizing chamber and said fuel conducting means to initially heat the inflowing liquid fuel together with the fuel contained within said vaporizing chamber, and an outlet passage in the regulating chamber for conducting the vaporized fuel to said engine in accord with the fuel demand of the engine.

4. In a vaporizing apparatus for vaporizing liquid fuel, a hollow casing, a vaporizing chamber in said casing wherein said fuel is vaporized with the bottom portion of the chamber having a generally curved configuration, a heating compartment in said casing defining a generally U-shaped passage for the circulation of a heating medium, said compartment including an upper leg extending beneath said vaporizing chamber from means defining an inlet in said compartment then downwardly and connecting to a lower leg extending to means defining an exit from said compartment at a point adjacent said inlet means, a fuel inlet passage in said casing and communicating at one end with said vaporizing chamber, said fuel passage extending beneath said vaporizing chamber between said upper leg and said lower leg of the heating compartment to heat the fuel before entry into said vaporizing chamber, and a vapor outlet port in said casing and communicating with the vaporizing chamber.

5. An apparatus for vaporizing liquid fuel which comprises a hollow casing defining an internal vaporizing chamber wherein liquid fuel is vaporized and a pressure regulating chamber, an inlet fuel passage disposed within the casing and serving to conduct liquid fuel from a source of supply to the vaporizing chamber, said inlet fuel passage extending generally coextensively with at least a substantial portion of said vaporizing chamber, a heating chamber disposed within the casing in heat conductive relation with both the vaporizing chamber and the inlet fuel passage but removed from the pressure regulating chamber to retard passage of heat to the regulating chamber and serving to conduct a heated fluid to heat fuel in the vaporizing chamber and to also initially heat fuel as the same flows within the inlet fuel passage to the vaporizing chamber, and discharge means to carry off vaporized fuel from said vaporizing chamber to the pressure regulating chamber.

References Cited in the file of this patent
UNITED STATES PATENTS

| | | |
|---|---|---|
| 2,248,222 | Ensign | July 8, 1941 |
| 2,272,341 | Holzapfel | Feb. 10, 1942 |
| 2,285,905 | Cunningham | June 9, 1942 |